United States Patent
Anderson

[11] 3,969,050
[45] July 13, 1976

[54] VERTICAL CURING MOLD FOR TUBE-TIRES

[75] Inventor: Arlynn Wesley Anderson, Peoria, Ill.

[73] Assignee: Caterpillar Tractor Co., Peoria, Ill.

[22] Filed: June 23, 1975

[21] Appl. No.: 589,169

[52] U.S. Cl. .................................. 425/40; 425/46; 425/35
[51] Int. Cl.² ........................................ B29B 5/02
[58] Field of Search ............... 425/22, 23, 24, 28 R, 425/35, 40, 46

[56] References Cited
UNITED STATES PATENTS

| | | | |
|---|---|---|---|
| 1,760,944 | 6/1930 | Glynn | 425/22 |
| 1,836,850 | 12/1931 | Hudson | 425/22 |
| 1,943,947 | 1/1934 | Bungay | 425/46 |
| 2,094,511 | 9/1937 | Welch | 425/40 X |
| 2,193,119 | 3/1940 | Bailey | 425/40 X |
| 2,444,898 | 7/1948 | Butterfield | 425/22 |
| 2,886,851 | 5/1959 | Strickler et al. | 425/23 |
| 3,324,506 | 6/1967 | Rifchin | 425/23 |
| 3,645,655 | 2/1972 | Benege | 425/35 |

Primary Examiner—J. Howard Flint, Jr.
Attorney, Agent, or Firm—Phillips, Moore, Weissenberger, Lempio & Strabala

[57] ABSTRACT

The invention is concerned with a curing apparatus for tube-tires. The apparatus includes a restrainer ring fittable about the outer circumference of a tube-tire and a mold comprising a pair of vertically disposed opposing mold members defining a cavity therebetween adapted to mateably hold the tire with the ring thereabout along with means extendible from the mold members for supportingly engaging the ring. Also part of the apparatus are means for moving at least one of the mold members towards and away from the other. Means are also provied communicating with each of the mold members for sealingly abutting against a respective adjacent edge of the restrainer ring along with means for retracting and expanding said abutting means responsive to expansion and contraction of the restrainer ring. Means are further provided within the mold for directing a heated fluid such as hot steam into and out of the tube-tire.

5 Claims, 5 Drawing Figures

Fig_3_

VERTICAL CURING MOLD FOR TUBE-TIRES

BACKGROUND OF THE INVENTION

Field of the Invention

The invention is concerned with a mold useful for curing tube-tires. More particularly the invention is concerned with a mold useful for curing tube-tires such as the tube-tires described in U.S. Pat. No. 3,606,921 but wherein the tube-tires are always held in a vertical position and wherein steam or another heated fluid is passed internally through the tube-tire to aid in the curing thereof.

Generally tires are cured in horizontal molds, the rubber or like material from which the tire is to be formulated being formed into the desired shape within the mold. These usual type tires are open towards the inner circumference thereof, said inner circumference normally being adapted to fit on rims affixed to an axle of a vehicle. Because of the generally open nature of the prior art tires, a heated inner mold member can be placed in contact with the inner surface of the tire. This is not possible with tube-tires wherein the only access to the interior of the tire is through openings in the tire. Such tube-tires generally include two openings through the inner circumference (donut hole) portion of the tire. Handling of uncured tube-tires is difficult since the uncured rubber material tends to flow on sitting. Thus it is highly advantageous to provide a support means for holding the tire to its desired shape. Further there is a general advantage in handling a tire always in an upright or vertical position since the tire takes up considerably less floor space and since complex hoisting and turning arrangements are not necessary for putting the tire in position for, for example, entering a horizontal mold for curing therein.

Accordingly, it is an object of the present invention to provide a vertical tube-tire curing apparatus useful for the curing of tube-tires wherein the necessity for placing the tire on its side never occurs and wherein sagging of the tire is eliminated during handling thereof and prior to and during curing thereof.

SUMMARY OF THE INVENTION

Briefly, the invention comprises a tube-tire curing apparatus adapted for handling and curing a tube-tire in a vertical position. The apparatus comprises a rigid tire restrainer ring fittable in mating relation about the outer circumference of a tube-tire and a mold comprising a pair of vertical disposed opposing generally circular mold members defining a cavity therebetween adapted to mateably hold said tube-tire and said ring and including a tire side mating portion and a tire inner circumference mating portion. Also a part of the apparatus are means for moving at least one of said mold members towards and away from the other and means extendible from each of said mold members for supportingly engaging said restrainer ring. The apparatus further includes means communicating with each of said mold members for sealingly abutting against a respective adjacent edge of said restrainer ring; means for retracting and extending said abutting means responsive to expansion and contraction of said restrainer ring; and means within said mold for directing a heated fluid into and out of said tube-tire.

BRIEF DESCRIPTION OF THE DRAWINGS

The invention will be better understood by reference to the drawings which illustrate preferred embodiments of the invention, wherein like numbers denote like parts throughout and wherein.

DESCRIPTION OF THE PREFERRED EMBODIMENTS

Figure 1:
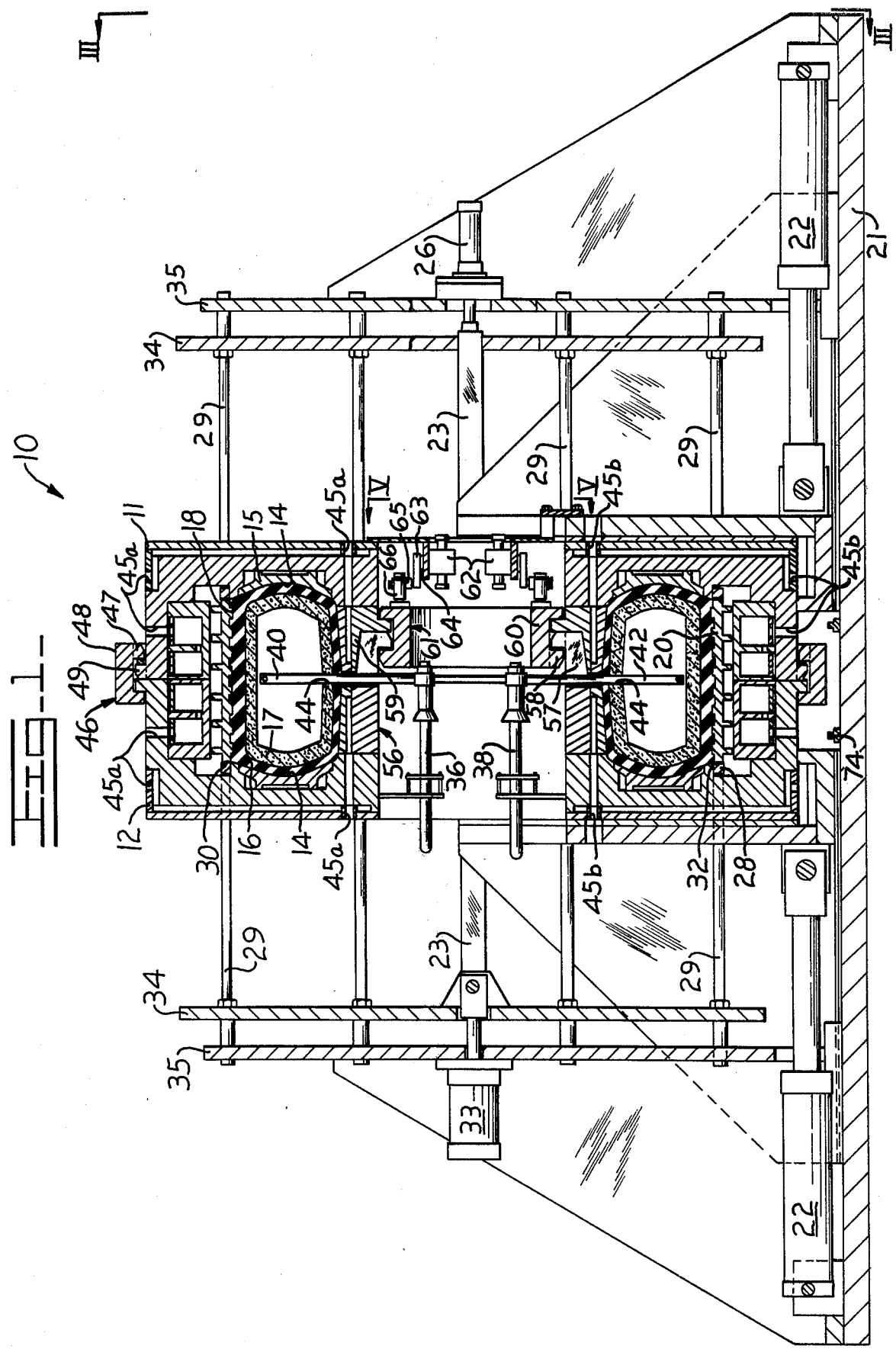
FIG. 1 illustrates in modified cross sectional view a mold of the present invention with a tube-tire therewithin.

The apparatus of the present invention includes a mold 10 comprising a pair of vertically disposed opposing generally circular mold members 11 and 12 defining a cavity 14 therebetween, which includes a tire side mating portion 15 and is adapted to mateably hold a tube-tire 16 having a formed soluble core 17 therewithin. The tube-tire 16 has fitted in mating relationship about the outer circumference 18 thereof a rigid tire restrainer ring 20 which prevents sagging of the tire during handling and further serves as a mold member to form the crown surface of the tire when the mold 10 is heated during the curing cycle. Attached between a floor or base 21 and at least one of the mold members 11 and 12 are a pair of hydraulic motors 22 which serve as means for moving at least one of said mold members 11 and 12 toward and away from the other. In the preferred embodiment illustrated, each of the mold members 11 and 12 is movable so as to provide a mating fit about the tube-tire 16 without requiring movement thereof. Two pairs of arms 23 are provided as seen in FIG. 2 which are extendible, one pair from each of the mold members 11 and 12 and which serve for supportingly engaging the restrainer ring 20 and thereby holding said restrainer ring and the tube-tire 16 in position for the mold to close thereabout. There are two arms 23 for each of the mold members 11 and 12 and each of the arms 23 are generally coplanar in a horizontal plane so as to provide firm and positive support for the restrainer ring 20. The arms 23 each include a finger 24 extending longitudinally therefrom at the bottom thereof. The fingers 24 fit supportingly within slots 25 shown in FIG. 4, in the restrainer ring 20. The arms 23 are extendible through action of the hydraulic motors 26 as shown for example in FIGS. 1 (right-hand side) and 3.

A pair of hoops 28 carried by a plurality of equally spaced rods 29 are provided for sealingly abutting against a respective edge 30 of the restrainer ring 20. The hoops 28 may each include a gasket 32 extensive therewith, said gasket 32 being stable at the curing temperature of the rubber. Teflon (a trademark of E. I. du Pont de Nemours Company, Wilmington, Delaware) gaskets are, for example, ideal for this duty. The gaskets 32 sit between the hoops 28 and the respective edge 30 of the restrainer ring 20. Such gaskets are not, however, necessary to the apparatus of the present invention. Means are included for retracting and extending the hoops 28 responsive to expansion and contraction of the restrainer ring 20. A pair of hydraulic motors 33 serve as a means for retracting and extending the rods 29 through moving a pair of plates 34 which are attached thereto and thus retracting and extending the hoops 28 as shown most clearly in FIGS. 1 (left-hand side) and 3. The plates 34 are moved away from a pair of fixed walls 35 by action of the motors 33. The inclusion of means for retracting and extending the means which sealingly abut the edges of the restrainer ring 20 is essential in compensating for thermal expansion of restrainer ring 20 when the tube-tire 16 and restrainer ring 20 are enclosed within the heated mold members 11 and 12 during the tire curing period.

Means are provided as a part of the preferred embodiment within the mold for directing a heated fluid, for example, steam or the like, into and out of the tube-tire 16. These means comprise the inlet tube 36 and outlet tube 38 acting through the conduits 40 and 42 respectively and connecting to a pair of ports 44 which pass through the inner circumference of the tube-tire and through the soluble core 17 to the interior thereof.

Figure 2:
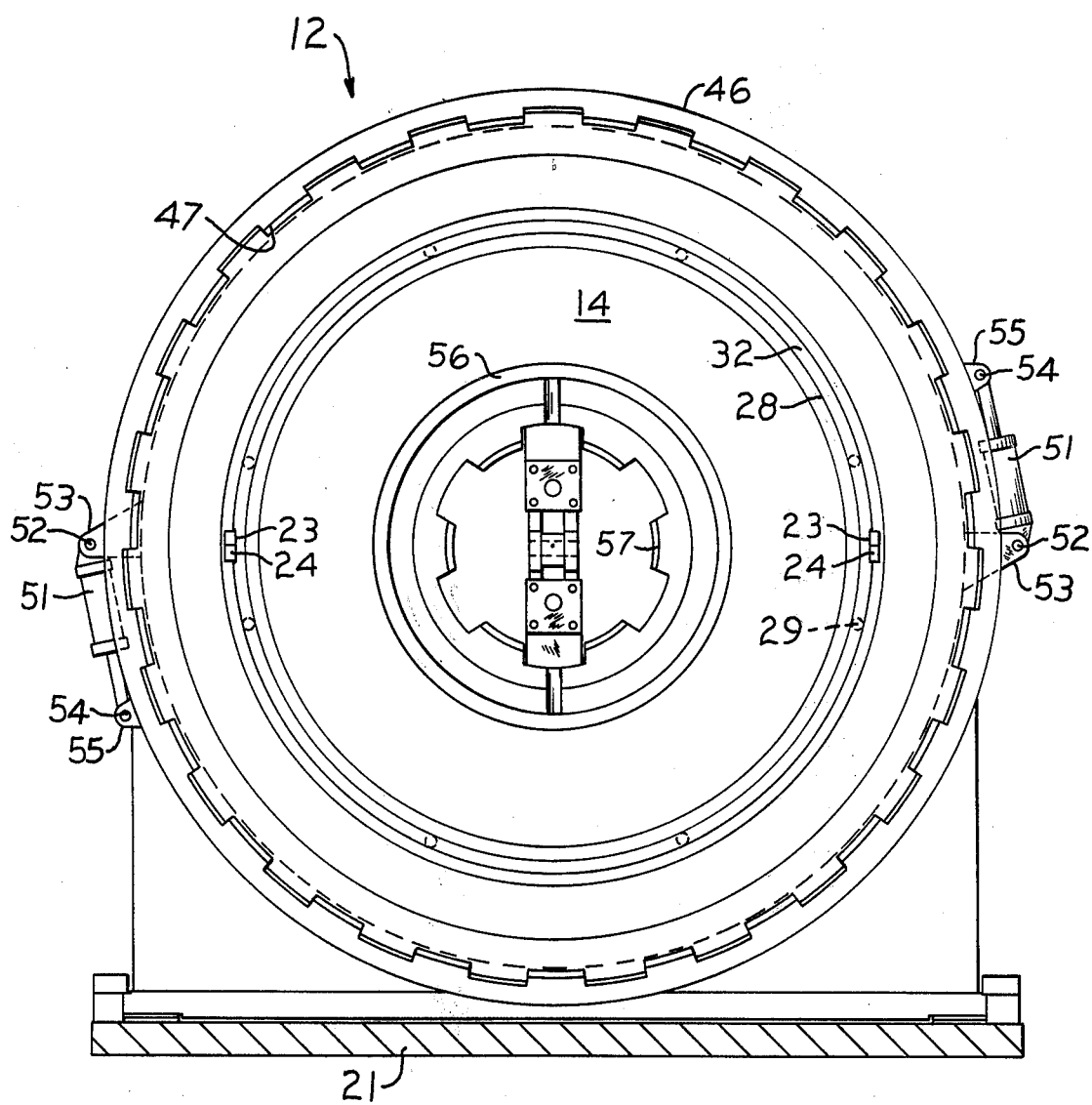
FIG. 2 illustrates in front elevation the left vertical mold member of the mold of FIG. 1.
Figure 3:
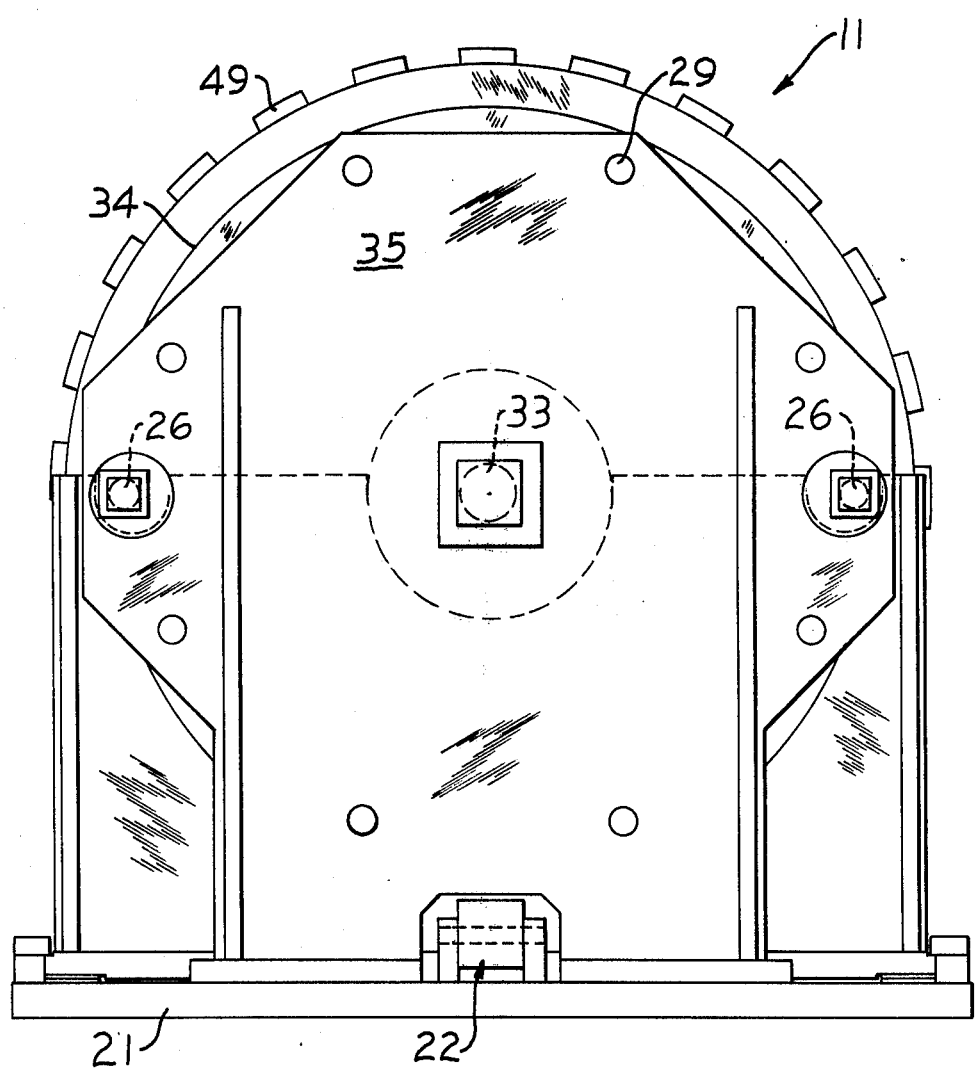
FIG. 3 illustrates in rear elevation the right vertical mold member of the mold of FIG. 1 as taken from the plane III—III.

As is illustrated in FIGS. 1 and 2, the mold members 11 and 12 are each heated so as to cure the tube-tire 16 from the outside as well as from the inside as for example by passing steam into them via the inlets 45a and out of them via the outlets 45b. The heating proceeds about the entire surface of the tube-tire 16 via appropriate cavities as illustrated in FIG. 1.

In the embodiment illustrated, the mold member 12 includes an outer locking ring 46 rotatingly mounted adjacent the periphery thereof, said outer locking ring 46 including a first plurality of equally spaced teeth 47 extending via a plurality of bridges 48 towards the mold member 11. The mold member 11 includes a second plurality of generally equally spaced teeth 49 extending outwardly from the outer periphery thereof, the first plurality of teeth 47 being sized to pass between the second plurality of teeth 49. Further, the apparatus includes means for rotating outer locking ring 46 of the mold member 12 relative to the mold member 11, namely the hydraulic motors 51 which act between the mold member 12 and the rotatingly mounted outer locking ring 46 and more particularly between a pair of pivots 52 on a pair of support members 53 which are rigidly fixed to the mold member 12 and a pair of pivots 54 on a pair of support members 55 which are rigidly fixed to the outer locking ring 46. In this manner, means are provided for passing the first plurality of teeth 47 through the second plurality of teeth 49 as the mold members 11 and 12 are moved together and means are further provided for rotating the outer locking ring 46 to lock the first plurality of teeth 47 behind the second plurality of teeth 49 thus rigidly fixing the mold 10 in place.

Extending from a tire inner circumference mating portion 56 of the mold member 12 are a third plurality of teeth 57. A fourth plurality of teeth 58 extend from a tire inner circumference mating portion 59 of the mold member 11, said fourth plurality of teeth 58 extending via a plurality of bridges 60. Said third plurality of teeth 57 are sized to pass between said fourth plurality of teeth 58 as said mold members 11 and 12 are moved towards one another. Further, the apparatus includes an inner locking ring 61 rotatingly mounted to the inner circumference mating portion 59 of the mold member 11 and having extending therefrom said fourth plurality of teeth 58. Means are included for rotating said inner locking ring 61 relative to the inner circumference mating portion 56 of the mold member 12, namely a pair of hydraulic motors 62, which move a pair of levers 63 about their pivots 64, thereby providing exaggerated lateral movement of a pair of rollers 65, each between a pair of rollers 66 affixed to the locking ring 61.

In use, the mold members 11 and 12 are moved together utilizing the motors 22 until the first plurality of teeth 47 and the second plurality of teeth 49 and the third plurality of teeth 57 and the fourth plurality of teeth 58 of the two mold members 11 and 12 pass through one another. Then through use of the motors 51, the first plurality of teeth 47 are lodged mechanically behind the second plurality of teeth 49 through rotation of the outer locking ring 46 and the third plurality of teeth 57 are lodged mechanically behind the fourth plurality of teeth 58 through rotation of the inner locking ring 61. When operating in this manner, it is not necessary to rotate either of the mold members 11 and 12.

In order to allow operation of the apparatus of the present invention without the need for overhead turning means or the like, means for vertically positioning the tube-tire 16 as held within the restrainer ring 20, in the embodiment illustrated a dolly 67 adapted to mateably hold the restrainer ring 20 in a cradle portion 68 thereof and to allow the tube-tire 16 within the restrainer ring 20 to be rolled between the mold members 11 and 12 can be provided as illustrated. Alternatively, overhead lifting means such as an electro-magnet or a mechanical grab can be utilized as the vertical positioning means. When a dolly 67 is used it preferably has means for lowering one end thereof after the ring engaging arms 23 have engaged the restrainer ring 20 sufficiently so that the dolly 67 can be rolled out from under the restrainer ring 20. One such means is, as illustrated, a cam 69 rotatingly mounted at an axle 70 and which is lowered through lengthening action of a hydraulic cylinder 72. Most preferably the apparatus, when it is used in combination with the dolly 67, includes a pair of tracks 74 leading from between the mold members 11 and 12 to adjacent the mold 10, and the dolly 67 rides on these tracks 74 which tracks 74 cause proper alignment of said arms 23 and said slots 25.

OPERATION

Figure 4:
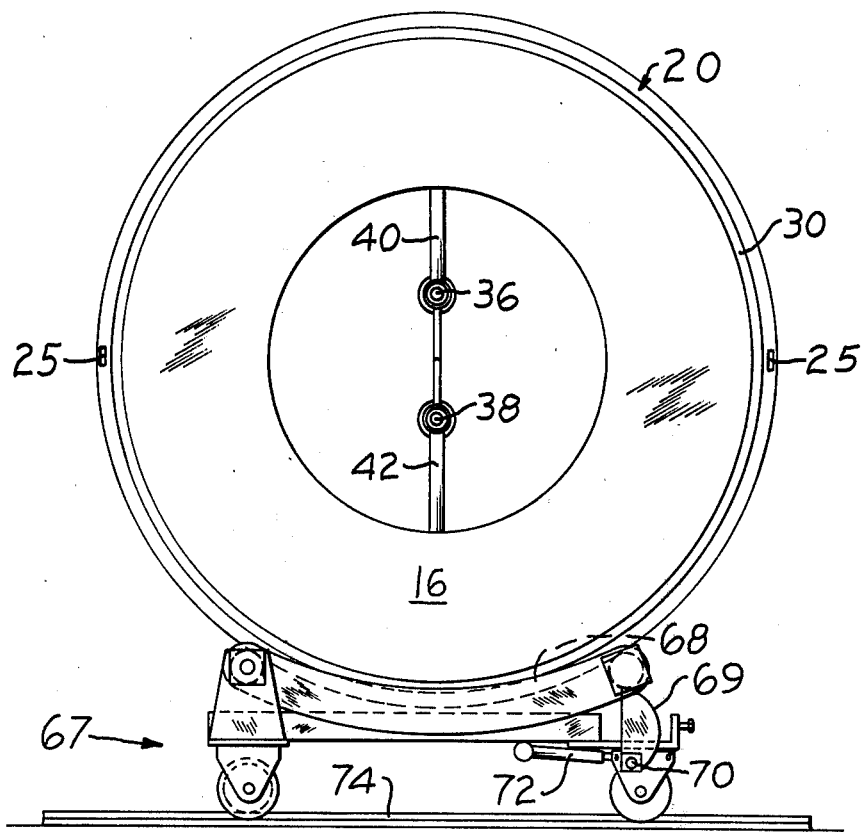
FIG. 4 illustrates a tube-tire with a restrainer ring of the present invention thereabout as held by a dolly.
Figure 5:
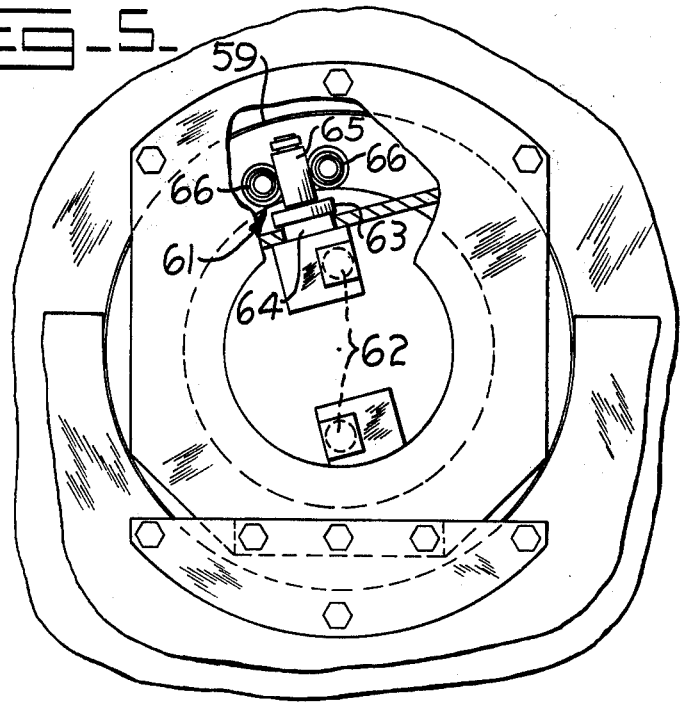
FIG. 5 illustrates a partial view, partially broken away, taken from the plane V—V of FIG. 1.

In operation, an uncured tube-tire 16 with an inner soluble core 17 is placed within a restrainer ring 20 in a vertical position as shown in FIG. 4, the restrainer ring 20 serving to ensure that the tube-tire 16 holds its shape. The restrainer ring 20 is then vertically positioned between the mold members 11 and 12 as by being placed upon the dolly 67 and rolled along the track 74 between the mold members 11 and 12. The fingers 24 of the arms 23 are extended into the mating holes 25 in the restrainer ring 20. At the same time, the hoops 28 seal against the edges 30 of the restrainer ring 20 under the impetus of the motors 33. The dolly 67 then has its forward end lowered and is rolled out along the tracks 74 to adjacent the mold 10. Thereafter the mold 10 is closed by moving at least one of the mold members 11 and 12 towards the other under the impetus of the motors 22. The mold members 11 and 12 are heated as hot steam or the like is passed therethrough. Similarly, hot steam is passed into the interior of the tube-tire 16 and then out therefrom while maintaining a positive pressure therewithin. Generally, the mold members 11 and 12 are preheated to the desired curing temperature. As the restrainer ring 20 expands due to its heating up, the hoops 28 which are hydraulically held in place by the hydraulic motors 33 give sufficiently so that the restrainer ring 20 and parts of the mold 10 are not damaged. The two mold members 11 and 12 have first been locked in place as by rotating the outer locking ring 46 so that the first plurality of teeth 47 on the mold member 12 is locked behind the second plurality of teeth 49 on the mold member 11 and by rotating the inner locking ring 61 so that the third plurality of teeth 57 on the mold member 12 are locked behind the fourth plurality of teeth 58 on the mold member 11.

After curing has proceeded for a desired period of time, the mold members 11 and 12 are separated through a rotation of the inner locking ring 61 and the outer locking ring 46 to free the first plurality of teeth 47 from the second plurality of teeth 49 and the third plurality of teeth 57 from the fourth plurality of teeth 58, the passage of steam through the interior of the tube-tire 16 is halted and a cured tube-tire is removed from the restrainer ring 20 after separation of the mold members 11 and 12. The dolly 67 can, for example, be used to remove the cured tube-tire/restrainer ring combination by rolling the dolly in under the restrainer ring 20, raising the lowered end thereof and then retracting the arms 23 until the restrainer ring 20 fits upon the cradle 68 of the dolly 67. Alternately, electromagnetic or other lifting means can be used to remove the now cured tube-tire 16 from between the mold members 11 and 12.

The curing times and temperatures used are common to the rubber curing art and are not critical or unique to the practice of the present invention. For completeness, however, it should be mentioned that typically curing temperatures for large earthmover tires fall within the range from about 120° C for times which fall within the range from about 100 minutes to about 300 minutes, generally longer times being used for lower temperatures and shorter times for higher temperatures.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A tube-tire curing apparatus useful for curing a vertically positioned tube-tire, comprising:
   a rigid tire restrainer ring fittable in mating relation about the outer circumference of an uncured tube-tire;
   a mold comprising a pair of vertically disposed opposing generally circular mold members defining when moved together a cavity therebetween adapted to mateably hold said tube-tire and including a tire side mating portion and a tire inner circumference mating portion;
   means for moving at least one of said mold members towards and away from the other;
   means communicating with each of said mold members for supportingly engaging said restrainer rings;
   means communicating with each of said mold members for sealingly abutting against a respective adjacent edge of said restrainer ring;
   means for retracting and extending said abutting means responsive to expansion and contraction of said restrainer ring; and
   means within said mold for directing a heated fluid into and out of said tube-tire.

2. An apparatus as in claim 1, including means for heating said mold members.

3. An apparatus as in claim 2, including vertical positioning means for positioning said tube-tire with said restrainer ring thereabout vertically between said mold members.

4. An apparatus as in claim 3, wherein said ring engaging means comprises two pair of arms, one pair extendible from each of said mold members, each of said pair of arms being generally in a single horizontal plane.

5. An apparatus as in claim 4, wherein said abutting means comprises a pair of hoops, one hydraulically extendible from each of said pair of mold members, each adapted to sealingly abut an adjacent end of said restrainer ring; said retracting and said extending means comprises a hydraulic motor; a first of said mold members includes an outer locking ring rotatingly mounted adjacent the periphery thereof having a first plurality of generally equally spaced teeth extending therefrom and means for rotating said outer locking ring and a second of said mold members has a second plurality of generally equally spaced teeth extending peripherally therefrom said first plurality of teeth being lockable by rotation of said outer locking ring against said second plurality of teeth when said mold members are moved together; the first of said mold members has a third plurality of teeth extending from the tire inner circumference mating portion thereof; the second of said mold members has an inner locking ring rotatingly mounted to the tire inner circumference mating portion thereof carrying a fourth plurality of teeth and means for rotating said inner locking ring, said third plurality of teeth being lockable by rotation of said inner locking ring against said fourth plurality of teeth when said mold members are moved together.

* * * * *